(12) United States Patent
Virtanen

(10) Patent No.: US 7,399,509 B2
(45) Date of Patent: Jul. 15, 2008

(54) THIN POLYETHYLENE PRESSURE SENSITIVE LABELS

(76) Inventor: Kari Virtanen, 1057 Columbine Rd., Asheville, NC (US) 28803

( * ) Notice: Subject to any disclaimer, the term of this patent is extended or adjusted under 35 U.S.C. 154(b) by 103 days.

(21) Appl. No.: 11/018,303

(22) Filed: Dec. 21, 2004

(65) Prior Publication Data

US 2005/0142319 A1 Jun. 30, 2005

Related U.S. Application Data

(60) Provisional application No. 60/532,304, filed on Dec. 23, 2003.

(51) Int. Cl.
  *B32B 9/00* (2006.01)
  *B32B 7/12* (2006.01)
  *B32B 7/02* (2006.01)
  *B42D 15/00* (2006.01)

(52) U.S. Cl. .................. 428/40.1; 428/213; 428/218; 428/220; 428/343; 283/81

(58) Field of Classification Search ............... 428/40.1, 428/343, 352, 409, 354, 220, 218, 213; 283/81
See application file for complete search history.

(56) References Cited

U.S. PATENT DOCUMENTS

| | | | |
|---|---|---|---|
| 3,808,089 A * | 4/1974 | Von Koeppen et al. ......... 162/5 |
| 4,587,158 A | 5/1986 | Ewing |
| 4,713,273 A | 12/1987 | Freedman |
| RE32,929 E | 5/1989 | Ewing |
| 4,888,075 A | 12/1989 | Freedman |
| 4,946,532 A | 8/1990 | Freedman |
| 5,064,893 A | 11/1991 | Hoenigmann |
| 5,075,152 A | 12/1991 | Tsukuda et al. |
| 5,089,322 A | 2/1992 | Matsunaga et al. |
| 5,143,570 A | 9/1992 | Freedman |
| 5,145,728 A | 9/1992 | Itaba et al. |
| 5,153,042 A | 10/1992 | Indrelie |
| 5,167,995 A | 12/1992 | Johnson et al. |
| 5,219,666 A | 6/1993 | Schirmer et al. |
| 5,227,233 A | 7/1993 | Itaba et al. |
| 5,330,812 A | 7/1994 | Knoerzer et al. |
| 5,364,695 A | 11/1994 | Gurewitz |
| 5,372,669 A | 12/1994 | Freedman |
| 5,376,417 A | 12/1994 | Amano et al. |
| 5,380,572 A | 1/1995 | Kotani et al. |
| 5,399,426 A | 3/1995 | Koch et al. |
| 5,427,727 A | 6/1995 | Tung |
| 5,455,092 A | 10/1995 | Tung |
| 5,456,979 A | 10/1995 | Schirmer |
| 5,468,535 A | 11/1995 | Amano et al. |
| 5,480,700 A | 1/1996 | Kume et al. |
| 5,516,393 A | 5/1996 | Freedman |
| 5,560,997 A | 10/1996 | Kotani et al. |
| 5,569,515 A | 10/1996 | Rice, II et al. |
| 5,569,693 A | 10/1996 | Doshi et al. |
| 5,585,193 A | 12/1996 | Josephy et al. |
| 5,595,810 A | 1/1997 | Beinert et al. |
| 5,614,297 A | 3/1997 | Velezquez et al. |
| 5,618,883 A | 4/1997 | Plamthottam et al. |
| 5,629,093 A | 5/1997 | Bischof et al. |
| 5,667,863 A | 9/1997 | Cullen et al. |
| 5,686,161 A | 11/1997 | Cullen |
| 5,700,564 A | 12/1997 | Freedman |
| 5,700,571 A | 12/1997 | Logue |
| 5,759,675 A | 6/1998 | Hamada et al. |
| 5,770,283 A | 6/1998 | Gosselin et al. |
| 5,811,163 A | 9/1998 | Ohno et al. |
| 5,830,571 A | 11/1998 | Mann et al. |
| 5,836,618 A | 11/1998 | Perlman |
| 5,840,430 A | 11/1998 | Ramsey et al. |
| 5,849,419 A | 12/1998 | Josephy et al. |
| 5,871,829 A | 2/1999 | Nishizawa et al. |
| 5,884,425 A * | 3/1999 | Baldwin ....................... 40/638 |
| 5,897,930 A | 4/1999 | Calhoun |
| 5,948,517 A | 9/1999 | Adamko et al. |
| 5,965,226 A | 10/1999 | Muschelewicz et al. |
| 5,972,486 A | 10/1999 | Cometto et al. |
| 5,976,682 A | 11/1999 | Eichbauer |
| 5,985,075 A | 11/1999 | Freedman |
| 5,993,961 A | 11/1999 | Ugolick et al. |
| 5,998,017 A | 12/1999 | Eichbauer |
| 6,004,682 A | 12/1999 | Rockovan et al. |
| 6,010,783 A | 1/2000 | Tung |
| 6,040,027 A | 3/2000 | Freedman |
| 6,090,483 A | 7/2000 | Kume et al. |
| 6,093,480 A | 7/2000 | Eichbauer |
| 6,099,927 A | 8/2000 | Freedman |
| 6,110,552 A | 8/2000 | Casey et al. |

(Continued)

FOREIGN PATENT DOCUMENTS

WO WO 00/13888 3/2000

*Primary Examiner*—Patricia L Nordmeyer
(74) *Attorney, Agent, or Firm*—Fitch, Even, Tabin & Flannery

(57) ABSTRACT

The invention is directed to an ultra thin pressure sensitive adhesive construction suitable for the high speed application of label mounting equipment. The labels include a polyethylene film having a density of from 0.917 to 0.924 g/cm$^3$ and a thickness of less than 1.8 mils; a pressure sensitive adhesive on one surface of the film; and a release composition coated paper liner having a thickness of less than 2.2 mils releasaby attached to the pressure sensitive adhesive.

20 Claims, No Drawings

U.S. PATENT DOCUMENTS

| | | |
|---|---|---|
| 6,110,599 A | 8/2000 | Edwards et al. |
| 6,146,744 A | 11/2000 | Freedman |
| 6,150,035 A | 11/2000 | DeFife et al. |
| 6,156,252 A | 12/2000 | Freedman |
| 6,183,862 B1 | 2/2001 | Ko et al. |
| 6,210,524 B1 | 4/2001 | Josephy |
| 6,228,449 B1 | 5/2001 | Meyer |
| 6,245,418 B1 | 6/2001 | Freedman |
| 6,270,871 B1 | 8/2001 | Scholz et al. |
| 6,291,590 B1 | 9/2001 | Sainio et al. |
| 6,294,268 B1 | 9/2001 | Muraoka et al. |
| 6,299,956 B1 | 10/2001 | Freedman |
| 6,299,968 B1 | 10/2001 | Karaoglu et al. |
| 6,348,249 B2 | 2/2002 | Meyer |
| 6,361,875 B1 | 3/2002 | Karaoglu et al. |
| 6,403,190 B1 | 6/2002 | Casey et al. |
| 6,461,555 B1 | 10/2002 | Freedman |
| 6,461,706 B1 | 10/2002 | Freedman |
| 6,472,056 B1 | 10/2002 | Rea et al. |
| 6,479,431 B1 * | 11/2002 | McFall et al. ............... 503/200 |
| 6,503,619 B1 | 1/2003 | Neal et al. |
| 6,511,743 B1 | 1/2003 | Ko et al. |
| 6,517,664 B1 | 2/2003 | Dronzek |
| 6,541,098 B2 | 4/2003 | Venkatasanthanam et al. |
| 6,579,602 B1 | 6/2003 | Freedman |
| 6,602,597 B1 | 8/2003 | Kerr, III |
| 6,620,473 B2 | 9/2003 | Nishezawa et al. |
| 6,627,283 B1 | 9/2003 | Freedman |
| 6,630,518 B1 | 10/2003 | Paronen |
| 6,632,519 B1 | 10/2003 | Jahromi et al. |
| 6,632,521 B2 | 10/2003 | Christopherson et al. |
| 6,632,522 B1 | 10/2003 | Hyde et al. |
| 6,635,701 B2 | 10/2003 | Tate et al. |
| 6,638,637 B2 | 10/2003 | Hager et al. |
| 6,641,914 B2 | 11/2003 | Lu |
| 6,649,104 B2 | 11/2003 | Tadokoro et al. |
| 6,652,937 B1 | 11/2003 | Guo et al. |
| 6,652,961 B2 | 11/2003 | Sargeant et al. |
| 6,652,984 B2 | 11/2003 | Finestone et al. |
| 6,653,431 B1 | 11/2003 | Razavi et al. |
| 6,660,360 B2 | 12/2003 | Mertzel et al. |
| 6,660,370 B2 | 12/2003 | Vogels et al. |
| 6,663,746 B2 | 12/2003 | Dronzek |
| 6,663,947 B2 | 12/2003 | Freedman |
| 6,666,969 B1 | 12/2003 | Funaoka et al. |
| 6,673,205 B2 | 1/2004 | Kokko |
| 6,689,857 B1 | 2/2004 | Larter et al. |
| 6,692,803 B2 | 2/2004 | Bonk et al. |
| 6,699,551 B2 | 3/2004 | Roth et al. |
| 6,706,145 B2 | 3/2004 | Werres et al. |
| 6,706,342 B2 | 3/2004 | Kong et al. |
| 6,706,392 B2 | 3/2004 | David et al. |
| 6,716,501 B2 | 4/2004 | Kovalchuk |
| 6,720,055 B2 | 4/2004 | Ogino et al. |
| 6,726,969 B1 | 4/2004 | Balaji et al. |
| 6,770,361 B2 | 8/2004 | Kong et al. |
| 6,787,222 B2 | 9/2004 | Biddiscombe |
| 6,932,592 B2 | 8/2005 | Farley et al. |
| 6,989,189 B2 | 1/2006 | Ludwig et al. |
| 7,125,933 B2 | 10/2006 | German et al. |
| 2001/0007703 A1 | 7/2001 | Weirather et al. |
| 2001/0030020 A1 | 10/2001 | Nandy et al. |
| 2002/0041945 A1 | 4/2002 | Scholz et al. |
| 2002/0114936 A1 | 8/2002 | Kong et al. |
| 2002/0146520 A1 | 10/2002 | Squier et al. |
| 2002/0146551 A1 | 10/2002 | Freedman |
| 2002/0155244 A1 | 10/2002 | Sakurai et al. |
| 2002/0168516 A1 | 11/2002 | Luhmann et al. |
| 2003/0008082 A1 | 1/2003 | Dronzek |
| 2003/0031865 A1 | 2/2003 | Rea et al. |
| 2003/0039826 A1 | 2/2003 | Sun et al. |
| 2003/0059564 A1 | 3/2003 | Ogino et al. |
| 2003/0072901 A1 | 4/2003 | Dronzek |
| 2003/0077442 A1 | 4/2003 | Inokuchi et al. |
| 2003/0077472 A1 | 4/2003 | Niepelt |
| 2003/0091848 A1 | 5/2003 | Hamulski |
| 2003/0102080 A1 | 6/2003 | Mallik |
| 2003/0107709 A1 | 6/2003 | Rodick |
| 2003/0113535 A1 | 6/2003 | Sun et al. |
| 2003/0152722 A1 | 8/2003 | Fearn et al. |
| 2003/0152735 A1 | 8/2003 | Koike |
| 2004/0013838 A1 | 1/2004 | Guenter |
| 2004/0033349 A1 | 2/2004 | Henderson |
| 2004/0043176 A1 | 3/2004 | Ogino et al. |
| 2004/0053022 A1 | 3/2004 | Ohlsson |
| 2004/0146699 A1 | 7/2004 | Dalgleish et al. |
| 2005/0025979 A1 * | 2/2005 | Sandt et al. ............... 428/424.6 |
| 2005/0136274 A1 | 6/2005 | Hamulski et al. |
| 2006/0177641 A1 | 8/2006 | Breese et al. |

\* cited by examiner

THIN POLYETHYLENE PRESSURE SENSITIVE LABELS

RELATED APPLICATION

This application claims the benefit of U.S. Provisional Application Ser. No. 60/532,304, filed Dec. 23, 2003.

FIELD OF THE INVENTION

The present invention relates to a novel very thin laminate construction which may be used for pressure sensitive adhesive labels and a method for making such a laminate construction. More particularly the invention relates to very thin layered constructions, such as sheets of labels, which include thin printable polyethylene facestock releasably bound with a pressure-sensitive adhesive to a thin paper liner.

BACKGROUND AND THE PRIOR ART

Labels are attached to containers for advertisement and appearance. In large commercial applications, labels are applied to substrate containers or goods with high speed equipment. High speed equipment transfers the label, or facestock, from a liner release sheet to the substrate container. Heretofore, the facestock has been at least 3.4 mils thick. The backing or liner material has been paper or a polymeric film such as polyethylene terephthalate. Thicknesses of the liner have varied, but paper liners have been at least 2.2 mils thick and more often at least 2.5 mils thick.

Ultra thin facestock having thickness a low as 0.7 mils is known when biaxially oriented polypropylene has been used for label facestock material in combination with polyethylene terephthalate (PET) liner material. Biaxially oriented polypropylene is stiff and even very thin biaxially oriented polypropylene having a thickness as low as 0.5 mils can lend itself to high speed label mounting operations. In these operations the label facestock for very small periods of time hangs in air after the liner, such as a polyethylene terephthalate liner, has been removed from the facestock during application of the label. The PET is tough and smooth, and hence, can be relatively thin. PET is smooth and will protect the clarity of polypropylene film. Paper liners are cheaper, but are too rough and put the clarity of polypropylene at risk. The toughness of PET will protect the thin low tensile strength of the polypropylene facestock label.

Polypropylene film facestock, however, is not without problems. Without a top coating, printing on the film surface scratches and needs to be over-coated with lacquer or layered with another polypropylene to mitigate scratching. Moreover, polypropylene is not readily printable as other films such as polyethylene. While polyethylene needs to be surface treated, such as with a corona treatment, to enhance printability, it is still less costly to corona treat polyethylene for printability than to over-coat polypropylene to mitigate scratching and enhance printability. Moreover, the stiffness of polypropylene works against its use on flexible substrates, such as squeezable bottles, where deformation of the label is important.

United States Patent Publication 2003/0152722 of Fearn et al. describes thin film facestock labels of 1 mil or less in conjunction with a polyester film release liner. This publication refers to the facestock films as polypropylene, polyethylene or PVC, but describes biaxially oriented polypropylene as "exemplary". Even if this polyethylene film is used for facestock, the publication appears to suggest that it should be biaxially oriented (as is the case with polypropylene), to attain sufficient stiffness for the film.

United States Patent Publication 2001/0030030 of Nandy et al. describes film label stock of polypropylene and polyethylene having a thickness of 2 mils laminated with a polyester release liner.

As with polypropylene films, the use of polyester liners, such as polyethylene terephthalate, has been thought necessary when attempting to produce extremely thin labels with thin polyethylene films. As can be seen from the Fearn et al. publication, the use of ink as well as biaxially oriented film has been thought necessary for the thin films to have sufficient strength and stiffness to survive high speed production conditions and avoid tearing and stretching. The polyester liners cause as well as solve problems. While they may strengthen the label stock, they also cause static electricity in the label stock which creates materials handling problems. Moreover, ultra thin facestocks also have required over lamination with another film to achieve sufficient durability for labeling operations.

U.S. Pat. No. 5,380,572 to Kotani et al. describes transparent pressure sensitive polyethylene labels. It does not specify the thickness of the polyethylene facestock used, but rather in a description of prior art generally describes a "label sheet" having 25 to 250 µm. This statement was made, however, in conjunction with the general utilization of rather stiff films such as PET and polyvinyl chloride films. Kotani et al. note that these stiff films can not be matched with flexible container substrates. In short, Kotani et al. does not suggest the use of thin polyethylene films for labels, especially in conjunction with inexpensive thin paper liners.

U.S. Pat. No. 4,587,158 to Ewing and its reissue patent, Re. 32,929, describe deformable polyethylene labels for squeezable bottles and other deformable substrates. Kotani et al. describe Ewing's labels at low densities as being fragile, especially very thin films with low densities. Ewing's films have thicknesses in the range of 0.05 mm to 0.127 mm at densities of from 0.910 to 0.925 $g/cm^3$ and from 0.076 mm to 0.0127 mm at densities of from 0.925 to 0.940 $g/cm^3$. At higher densities and thicknesses, Ewing's labels will inherently not have the clarity of the very thin film labels having relatively low densities.

U.S. Pat. No. 6,099,927 to Freedman describes die cut film labels having a thickness of less than 3 mils, e.g. 2 to 3 mils, but does not suggest the ultra thin facestock or the thin facestock with a thin liner as described in connection with the instant invention.

SUMMARY

The invention is directed to an ultra thin pressure sensitive adhesive construction suitable for the high speed application of label mounting equipment, a method of making such labels and a method for applying the labels. The labels of the invention include:

a polyethylene film having a density of from 0.910 to 0.924 $g/cm^3$ and a thickness of less than 1.8 mils;

a pressure sensitive adhesive on one surface of the film; and a release composition coated paper liner having a thickness of less than 2.2 mils releasaby attached to the pressure sensitive adhesive.

The invention also is directed to a method for making the construction with vacuum rollers to reduce tension on the thin films during lamination of the facestock with the paper liner. The method comprises moving a polyethylene film facestock web having a density of from 0.917 to 0.924 $g/cm^3$ and a thickness of less than 1.8 mil with at least one vacuum roller downstream to a lamination nip. The paper liner web having a thickness of less than 2.2 mils also is moved downstream to the lamination nip. A pressure sensitive adhesive is applied onto one surface of the paper liner web to adhesively laminate the film facestock with the adhesive on the paper liner web at the lamination nip to releasably attach the liner web to the facestock film web.

In an important aspect, the pressure sensitive adhesive construction includes polyethylene film having a density of 0.917 to 0.920 g/cm$^3$, a thickness of less than 1.8 mils and a paper liner having a thickness of from 1.0 to 2.0 mils. These labels will have a haze of less than 4% as measured by ASTM test D1003. In a very important aspect, the polyethylene film has a thickness of less than 1.2 mils or in the range of 1.0 to 1.2 mils and the paper liner has a thickness in the range of from 1.0 to 1.8 mils with the film having a haze of not more than 4%.

The invention advantageously provides a label which not only uses less materials for facestock and liner, the invention provides deformable labels which are mountable on deformable containers and will stay attractive throughout cycles of mechanical stress, temperature change and/or atmospheric exposure without shrinking, wrinkling or otherwise being deleteriously affected by stress and deformation.

Moreover, the invention does not require a polymeric film which has a special ratio of stiffness in the cross direction/ machine direction or special ratio of the weight average molecular weight ($M_{MW}/M_{MN}$), but such latter molecular weight ratios may exceed 7 and go as high as 10 or more. The invention also does not require an oriented polyethylene which may be too stiff for appropriate mounting onto a deformable surface such as a squeeze bottle. The label is not only thin, but has the ability to be mounted and adhere to a flexible and deformable surface. In an important aspect the surface of the facestock of the polyethylene film is treated or otherwise modified to make the surface more suitable for printing. Such a treatment includes corona treatment or print-varnishing.

In the invention, the use of a paper liner is important to avoid the static electricity created by polymeric film liners, yet provide the labelstock comprising the facestock and liner with sufficient strength and durability. The paper liner used in the invention is a glassine type of paper made from an elementary chlorine free (ECF) pulp (hardwood or softwood), poly vinyl alcohol (PVOH) based surface sizing and internal sizing. In production of the glassine paper used in the invention, high refining level of the fibers, surface sizing with poly-vinyl alcohol (PVOH), rewetting before calendering and heavy super calendering produces a dense (at least about 1050 kg/m$^3$, preferably about 1090 kg/m$^3$ or more), strong (a tensile strength of at least about 5 kN/m for the MD and at least 2 kN/m for the CD, but preferably a tensile strength md/cd 6.5/2.5 k newtons/meter [N/m] or more) and transparent (transparency at least about 50% and preferably 62% or more) uncoated, surface sized, non-filler added paper liner. A release coating composition may be applied by siliconizing the surface of the paper. The paper may be siliconized by solventless siliconizing, solvent based siliconizing, emulsion siliconizing, UV cured siliconizing, and low temperature curing methods.

The labels of the invention may be mounted using a labeling machine which utilizes a vacuum belt where the die cut labels are peeled from the liner and moved to a vacuum belt which positions the label at the point of adhering the label to the substrate, such as a substrate container. At the point of dispensing and adhering the label, the vacuum is released and the label is transferred to the substrate. The vacuum belt moves continuously and permits use of labels with a lower stiffness whereas machines without a vacuum belt or roller stop and start at very high speeds which demand stiffness and strength in a label. Labeling machines which have a vacuum operation as described are available from Harland Machine Systems, Salford, U.K.

DETAILED DESCRIPTION

The polyethylene for the facestock of the label should be treated or otherwise modified to enhance the ability of the film to be coated and retain adhesive and printing. An indirect coating process may be used to coat the thin paper liner with a suitable release composition such as a silicone or another convention material used for this purpose as is known. Thereafter the coated sheet is passed through a heated oven to cure the release composition. The cured surface is a release surface to permit easy release or peeling of the liner from the facestock so that the facestock or label can be readily applied to a substrate surface. The release surface is usually a cross-linked poly-di-methyl-siloxane (silicone), but also can be other coatings with very low surface energy.

After preparation of the surface of the liner with the release composition, the liner is then coated with a pressure sensitive adhesive. Methods for coating the adhesive onto the surface of the release composition on the liner include knife coating, roller coating, gravure coating, spray coating and other forms of known coating. After application of the adhesive on the release composition coating liner, the adhesive coated liner is laminated onto the thin polyethylene facestock.

The thin polyethylene facestock also may be coated with the adhesive and then the adhesive-coated film is laminated with the release composition coated liner. Adhesives which may used in the invention include copolymers of vinyl acetate, vinyl ethers, vinyl chloride, copolymers of styrene, butadiene, acrylonitrile, acrylics and isoprene. In addition to the polymer, the adhesives also might contain tackifiers based on natural rosin or synthetic hydrocarbons, and plasticizers such as mineral oil or phthalates. Commercial adhesives which may be used include, but are not limited to Robond available for Rohm & Haas, Acronal available from BASF and Flexcryl commercially available from Air Products.

The facestock film which is formed into and used as labels generally is wound and then unwound into roll form. The same is true of the paper liner. After lamination of the facestock with the thin paper liner, the total construction or laminate is wound into a master roll forming the pressure sensitive adhesive laminate roll. This roll of stock then may be die cut and printed into labels. The labels with liner may also, however, be supplied as sheets.

The lamination process using thin materials of the invention requires careful monitoring of the tension of the stock forming the rolls. In a preferred aspect, automatic tension control equipment and vacuum rollers are used in the lamination process. Normally the web tension throughout the coating line for making the paper lined polyethylene film should be at a minimum level of 300 N/m in order to ensure the functionality of the web guides and that web handling through coating stations and dryers. High tensions stretch the film for the facestock, especially polyethylene, and this results in severe machine directional curl of the pressure sensitive label stock as the film tries to return to its original dimensions after the facestock and the liner are joined together. To overcome this problem vacuum rollers should be on the coating machine. Vacuum rollers allow the web tension to be dropped to a level that does not stretch the film before lamination. The vacuum roller(s) should be located in close proximity to the laminator to ensure a short web path for the web(s) with low tensions for the reasons set forth above. As a result, the close proximity to the next isolated tension group, the laminator, requires an extremely precise control loop in order to properly function. High precision equipment and care are required to make a functional loop especially in the acceleration and deceleration of a coating line. Vacuum rollers also prevent the web from forming creases as opposed to tension groups with nips when the tension is low.

In a preferred aspect, the vacuum roller is located just upstream of the lamination nip where the facestock and paper liner are laminated. The vacuum roller has a lower speed than the line speed and the film label is held with the vacuum which permits lowering the tension on the film label prior to lamination. This helps reduce film stretching which in turn reduces label curl.

The thin paper liner used in the invention is a glassine paper made using a pulp made by a chemical sulphate pulping process on wood fibers and ECF and subsequent bleaching. Prior to the chemical pulping of the fibers, wood is mechanically debarked and cut into chips, and the chips are screened before they are treated chemically to form fibrous pulp. Lignin and some carbohydrate material are dissolved from wood chips during cooking the chips in aqueous solutions of several alternative alkaline, neutral, or acid components at elevated temperature and pressure. Bleaching the cooked chips is a known purification process in which colored substances in the chips are modified so that they either loose their light absorption ability or they dissolve. Bleaching also reduces the lignin content to zero or a near zero level. The bleached pulp is dried and baled for shipment to the paper mill.

The paper is manufactured from the bleached pulp on the paper machine by using the aforedescribed fibers, surface sizing and internal sizing agents. The components are prepared and diluted into high amount of water (99%) and sent to the paper machine. The water is removed during paper making process by using different unit operations (wet end, press section, drying section). In production of thin glassine paper the paper is first dried into low moisture content and the paper is surface sized. After this part the paper is remoistured to high moisture (>15%) and reeled for supercalendering. Supercalendering is done by using high stack of soft and hard rolls and leading the paper web between the nips. High temperature and pressure of about 90 to 140° C. and 450 to 500 kN/m (at the maximum) are used in supercalendering. After supercalendering, the paper is ready for slitting. The moisture content of ready paper is 5.5-7.5%.

What is claimed is:

1. A label facestock material and deformable container combination, the combination comprising:
   a non-oriented polyethylene printed film facestock having a density of from 0.917 to 0.920 g/cm$^3$ and a thickness of less than 1.8 mils and a haze of not more than 4%, the printed film facestock having a bottom surface and a printed top surface;
   a pressure sensitive adhesive on the bottom surface of the film; and
   a deformable container, the pressure sensitive adhesive affixing the printed film facestock to the deformable container.

2. The label facestock material and deformable container combination as recited in claim 1 wherein the film has a thickness of from 1.0 to 1.2 mils.

3. A label construction consisting essentially of:
   a non-oriented polyethylene film facestock having a density of from 0.917 to 0.920 g/cm$^3$ and a thickness of from 1.0 to 1.8 mils, the film facestock having a printable top surface and bottom surface;
   a super calendered paper liner having a surface with a release composition; and
   a pressure sensitive adhesive on one surface of the film facestock, the pressure sensitive adhesive on the bottom surface of the film facestock, the surface of the liner with the release composition providing a release surface effective for removably affixing the liner to the pressure sensitive adhesive and the bottom surface of the film, the pressure sensitive adhesive interfacing with the release composition and effective for affixing the face stock to a substrate after removal of the liner, the paper liner having a thickness of from 1.0 to 2.0 mils.

4. The label construction as recited in claim 3 wherein the film has a haze of not more than 4%.

5. The label construction as recited in claims 3 or 4 wherein the film has a thickness of from 1.0 to 1.2 mils.

6. The label construction as recited in claim 3 wherein the super calendered paper liner has a density of at least 1050 kg/m$^3$, a tensile strength of at least about 5 kN/m in the MD and a tensile strength of at least 2 kN/m in the CD.

7. A pressure sensitive adhesive label construction comprising:
   a non-oriented polyethylene film facestock having a density of from 0.917 to 0.924 g/cm$^3$ and a thickness of less than 1.8 mils, the facestock having a printable top surface and bottom surface which bottom surface is effective for being adhesively affixed to a substrate;
   a super calendered paper liner having a thickness of less than 2.2 mils;
   a pressure sensitive adhesive on one surface of the facestock, the pressure sensitive adhesive on the bottom surface of the facestock, the adhesive on the bottom surface opposite the printable top surface, the pressure sensitive adhesive effective for affixing the bottom surface of the facestock to a substrate after removal of the liner and transfer of the facestock from the liner as a label to the substrate for display of the printable top surface; and
   a release composition on the surface of the paper liner and between the pressure sensitive adhesive on the bottom surface of the facestock and the paper liner, the liner removably affixed to the pressure sensitive adhesive and the bottom side of the facestock, the liner being removed from the facestock prior to adhesively affixing the facestock to the substrate.

8. The pressure sensitive adhesive label construction as recited in claim 7 wherein the paper liner has a thickness of from 1.8 to 2.0 mils.

9. The pressure sensitive adhesive label construction as recited in claim 8 wherein the film has a density of from 0.917 g/cm$^3$ to 0.920 g/cm$^3$.

10. The pressure sensitive adhesive label construction as recited in claim 7 wherein the polyethylene film has a haze of not more than 4%.

11. The pressure sensitive adhesive label construction as recited in claims 7, 8 or 10 wherein the polyethylene film has a thickness in the range of 1.0 to 1.2 mils and the paper liner has a thickness in the range of from 1.0 to 1.8 mils.

12. The pressure sensitive adhesive label construction as recited in claim 11 wherein the film has a density of from 0.917 g/cm$^3$ to 0.920 g/cm$^3$.

13. A pressure sensitive adhesive label construction which is in a web form which provides labels which are removed from the construction for application as a label facestock to a substrate, the construction comprising:

a non-oriented polyethylene film facestock web having a density of from 0.917 to 0.920 g/cm³ and a thickness of from 1.0 to 1.2 mils, the film facestock web forming a top film layer which is transferrable from the construction as a label having a pintable top surface and bottom surface which bottom surface is effective for being adhesively affixed to a substrate;

a super calendered paper liner having a thickness of from 1.0 to 2.0 mils;

a pressure sensitive adhesive on one surface of the facestock web, the pressure sensitive adhesive on the bottom surface of the facestock web, the bottom surface opposite the printable top surface, the adhesive effective for affixing the bottom surface of a facestock label from the facestock web to a substrate after removal of the liner and transfer of the facestock as a label to the substrate for display of the printable top surface; and a release composition on the surface of the paper liner and between the pressure sensitive adhesive on the bottom surface of the facestock web and the paper liner, the liner being removably affixed to the pressure sensitive adhesive and the bottom side of the facestock web, the liner being removed from the facestock label prior to affixing the label to the substrate.

14. The pressure sensitive adhesive label construction as recited in claim 13 wherein the paper liner has a thickness in the range of from 1.0 to 1.8 mils.

15. A pressure sensitive adhesive label construction comprising:

a non-oriented polyethylene film facestock having a density of from 0.917 to 0.920 g/cm³ and a thickness of from 1.0 to 1.2 mils, the film facestock forming a top layer of the construction for transfer from the construction as a label to a substrate, the film facestock having a printable top surface and bottom surface which bottom surface is effective for being adhesively affixed to a substrate;

a super calendered paper liner having a thickness of from 1.0 to 2.0 mils;

a pressure sensitive adhesive on one surface of the facestock, the pressure sensitive adhesive on the bottom surface of the film facestock opposite surface from the printable top surface, the adhesive effective for affixing the bottom surface of the facestock to a substrate after removal of the liner; and a release composition on the surface of the paper liner and between the pressure sensitive adhesive on the bottom surface of the film facestock and the paper liner, the liner being removably affixed to the pressure sensitive adhesive and the bottom side of the film, the liner being removed from the film facestock prior to affixing the film facestock to the substrate.

16. The pressure sensitive adhesive label construction as recited in claim 15 wherein the paper liner has a thickness in the range of from 1.0 to 1.8 mils.

17. A pressure sensitive adhesive label construction which is in a web form which provides labels which are removed from the construction for application as a label face stock to a substrate, the construction comprising:

a non-oriented polyethylene film face stock web having a density of from 0.917 to 0.920 g/cm³ and a thickness of from 1.0 to 1.2 mils, the film facestock forming a top layer of the construction for transfer as a label to a substrate, the film facestock having a printable top surface and bottom surface;

a pressure sensitive adhesive on one surface of the film, the adhesive on the bottom film surface opposite the printable top surface, the adhesive effective for adhesively affixing the bottom surface of the face stock to a substrate; and a super calendered paper liner having a thickness of from 1.0 to 2.0 mils, a density of at least 1050 kg/m³, a tensile strength of at least about 5 kN/m in the MD and a tensile strength of at least 2 kN/m in the CD, the paper liner being removably affixed to the pressure sensitive adhesive on the film, the liner being removed from the face stock prior to affixing the facestock to the substrate with the pressure sensitive adhesive.

18. The pressure sensitive label construction as recited in claim 17 wherein the paper liner is made from chemical pulp and has surface and internal sizing agents.

19. The pressure sensitive label construction as recited in claim 17 wherein the label construction further comprises a release composition between the adhesive on the bottom surface of the face stock and the paper liner, the liner being removably affixed to the pressure sensitive adhesive and the bottom side of the film, the liner being removed from the face stock prior to adhesively affixing the label face stock to the substrate.

20. The label construction as recited in claim 7 wherein the super calendered paper liner has a density of at least 1050 kg/m³, a tensile strength of at least about 5 kN/m in the MD and a tensile strength of at least 2 kN/m in the CD.

* * * * *